United States Patent
Kauffmann et al.

(10) Patent No.: US 9,213,413 B2
(45) Date of Patent: Dec. 15, 2015

(54) DEVICE INTERACTION WITH SPATIALLY AWARE GESTURES

(71) Applicant: Google Inc., Mountain View, CA (US)

(72) Inventors: Alejandro Jose Kauffmann, San Francisco, CA (US); Christian Plagemann, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 95 days.

(21) Appl. No.: 14/145,002

(22) Filed: Dec. 31, 2013

(65) Prior Publication Data

US 2015/0185854 A1    Jul. 2, 2015

(51) Int. Cl.
*G06F 3/042*    (2006.01)
*G06F 3/01*    (2006.01)
*G06F 3/00*    (2006.01)

(52) U.S. Cl.
CPC ............... *G06F 3/017* (2013.01); *G06F 3/005* (2013.01)

(58) Field of Classification Search
CPC ......... G06F 1/1694; G06F 3/005; G06F 3/01; G06F 3/017; G06F 3/0304; G06F 3/0425; G06F 3/048; G06F 3/04842; G06F 3/0488; G06K 9/00355; H04N 21/44218
See application file for complete search history.

(56) References Cited

U.S. PATENT DOCUMENTS

| | | | |
|---|---|---|---|
| 6,526,395 B1 | 2/2003 | Morris | |
| 7,988,037 B2 * | 8/2011 | Yach | 235/375 |
| 8,059,111 B2 | 11/2011 | Harrison | |
| 8,255,836 B1 | 8/2012 | Gildfind | |
| 8,259,163 B2 | 9/2012 | Bell | |
| 8,312,392 B2 | 11/2012 | Forutanpour et al. | |
| 8,354,997 B2 | 1/2013 | Boillot | |
| 8,373,673 B2 | 2/2013 | Shiplacoff et al. | |
| 8,380,225 B2 | 2/2013 | Cheng et al. | |
| 8,405,729 B2 * | 3/2013 | Jain | 348/207.1 |
| 8,457,651 B2 | 6/2013 | Forutanpour et al. | |
| 8,560,976 B1 | 10/2013 | Kim | |
| 2006/0101354 A1 | 5/2006 | Hashimoto et al. | |
| 2008/0141181 A1 | 6/2008 | Ishigaki et al. | |
| 2008/0263479 A1 | 10/2008 | Bloem et al. | |
| 2009/0017799 A1 | 1/2009 | Thorn | |
| 2010/0012715 A1 * | 1/2010 | Williams et al. | 235/375 |
| 2010/0031202 A1 | 2/2010 | Morris et al. | |
| 2011/0043602 A1 | 2/2011 | Lee | |
| 2011/0117535 A1 | 5/2011 | Benko et al. | |
| 2011/0163944 A1 | 7/2011 | Bilbrey et al. | |
| 2011/0185309 A1 | 7/2011 | Challinor et al. | |

(Continued)

FOREIGN PATENT DOCUMENTS

EP    2660680    11/2013

OTHER PUBLICATIONS

MarksThinkTank,"Wave control", Google Scholar, Android App, Jan. 31, 2013.

(Continued)

*Primary Examiner* — Joe H Cheng
(74) *Attorney, Agent, or Firm* — Fish & Richardson P.C.

(57) ABSTRACT

Described is a system and technique for providing the ability for a user to interact with one or more devices by performing gestures that mimic real-world physical analogies. More specifically, the techniques described herein provide the ability for a user to interact with a device by limiting the conscious gesturing for a computer component by camouflaging computer-recognizable gestures within manipulations of a physical objects.

20 Claims, 7 Drawing Sheets

(56) References Cited

U.S. PATENT DOCUMENTS

| | | | |
|---|---|---|---|
| 2011/0193939 A1 | 8/2011 | Vassigh et al. | |
| 2011/0289455 A1 | 11/2011 | Reville et al. | |
| 2012/0001875 A1 | 1/2012 | Li et al. | |
| 2012/0131518 A1 | 5/2012 | Lee et al. | |
| 2012/0139907 A1 | 6/2012 | Lee et al. | |
| 2012/0163625 A1 | 6/2012 | Siotis et al. | |
| 2012/0169583 A1* | 7/2012 | Rippel et al. | 345/156 |
| 2012/0192108 A1 | 7/2012 | Kolb | |
| 2012/0208466 A1* | 8/2012 | Park et al. | 455/41.3 |
| 2012/0324368 A1 | 12/2012 | Putz et al. | |
| 2012/0329529 A1 | 12/2012 | Van Der Raadt | |
| 2013/0055150 A1 | 2/2013 | Galor | |
| 2013/0083252 A1 | 4/2013 | Boyes | |
| 2013/0120243 A1 | 5/2013 | Kim et al. | |
| 2013/0141468 A1* | 6/2013 | Coon | 345/661 |
| 2013/0183021 A1* | 7/2013 | Osman | 386/239 |
| 2013/0207894 A1* | 8/2013 | Miyashita et al. | 345/158 |
| 2013/0227418 A1 | 8/2013 | Sa et al. | |
| 2013/0229345 A1 | 9/2013 | Day et al. | |
| 2013/0257748 A1 | 10/2013 | Ambrus et al. | |
| 2013/0326431 A1 | 12/2013 | Björklund et al. | |
| 2014/0006944 A1 | 1/2014 | Selig et al. | |
| 2014/0007022 A1 | 1/2014 | Tocino Diaz et al. | |
| 2014/0028712 A1* | 1/2014 | Keating et al. | 345/633 |
| 2014/0168098 A1* | 6/2014 | Lucero et al. | 345/173 |
| 2014/0229858 A1 | 8/2014 | Bleker et al. | |
| 2014/0244447 A1* | 8/2014 | Kim et al. | 705/27.2 |
| 2014/0317659 A1* | 10/2014 | Yasutake | 725/43 |

OTHER PUBLICATIONS

Von Hardenberg et al.,"Bare-Hand Human-Computer Interaction", Proceedings of the ACM Workshop on Perceptive User Interfaces, pp. 1-8, Nov. 2001.

\* cited by examiner

DEVICE INTERACTION WITH SPATIALLY AWARE GESTURES

BACKGROUND

Computer systems employ various techniques in order to provide improved user interfaces. One such technique is the ability to receive various forms of input in addition to physical inputs such as those from a controller, keyboard, and/or mouse. For example, a system may include a gesture interface in order to receive inputs via gesture movements. These systems, however, often require the user to learn and perform explicitly defined gestures. Moreover, gestures may involve unusual and/or conspicuous movements to aid in the process of gesture recognition. Accordingly, these predefined gestures often do not feel natural or intuitive to a user.

BRIEF SUMMARY

Described is a system and technique for providing the ability for a user to interact with one or more devices by performing gestures that are intuitive to a user. In an implementation, described is a method including detecting, by a computing device, a first user within a field-of-view of a capture device operatively coupled to the computing device, and detecting a first gesture performed by the first user, the first gesture performed while holding a first device with a first hand. The method may also include identifying the first device and sending, by the computing device and in response to the first gesture, an instruction to the first device to perform an action.

In an implementation, described is a device including a processor configured to detect, by a computing device, a first user within a field-of-view of a capture device operatively coupled to the computing device, and detect a first gesture performed by the first user, the first gesture performed while holding a first device with a first hand. The processor may also be configured to identify the first device and send, by the computing device and in response to the first gesture, an instruction to the first device to perform an action.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a system and technique for providing the ability for a user to interact with one or more devices by performing gestures that are intuitive to a user. More specifically, the techniques described herein provide the ability for a user to interact with a device by limiting conscious gesturing by camouflaging recognizable gestures within physical manipulations of objects. Accordingly, a user may interact with a device in manner that feels less contrived and relates to a user's understanding of the physical world. For example, sharing a content item by handing the device displaying the content to another user feels intuitive to the user because the gesture mimics the sharing of object in the real-world.

Figure 1:
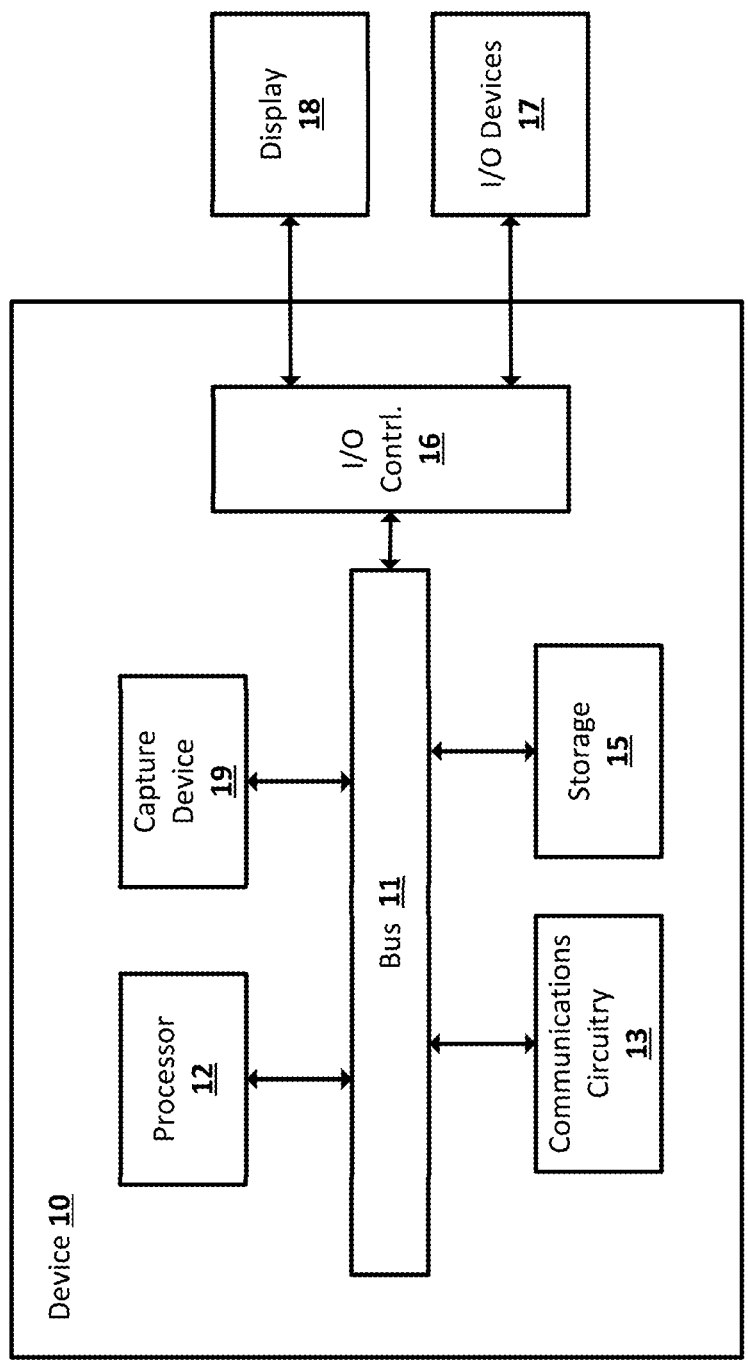
FIG. 1 illustrates a functional block diagram of a representative device according to an implementation of the disclosed subject matter.

FIG. 1 illustrates a functional block diagram of a representative device according to an implementation of the disclosed subject matter. The device 10 may include a bus 11, processor 12, memory 14, I/O controller 16, communications circuitry 13, storage 15, and a capture device 19. The device 10 may also include or may be coupled to a display 18 and one or more I/O devices 17.

The device 10 may include or be part of a variety of types of devices, such as a set-top box, television, media player, mobile phone (including a "smartphone"), computer, or other type of device. The processor 12 may be any suitable programmable control device and may control the operation of one or more processes, such as gesture recognition as discussed herein, as well as other processes performed by the device 10. As described herein, actions may be performed by a computing device, which may refer to a device (e.g. device 10) and/or one or more processors (e.g. processor 12). The bus 11 may provide a data transfer path for transferring between components of the device 10.

The memory 14 may include one or more different types of memory which may be accessed by the processor 12 to perform device functions. For example, the memory 14 may include any suitable non-volatile memory such as read-only memory (ROM), electrically erasable programmable read only memory (EEPROM), flash memory, and the like, and any suitable volatile memory including various types of random access memory (RAM) and the like.

The communications circuitry 13 may include circuitry for wired or wireless communications for short-range and/or long range communication. For example, the wireless communication circuitry may include Wi-Fi enabling circuitry for one of the 802.11 standards, and circuitry for other wireless network protocols including Bluetooth, the Global System for Mobile Communications (GSM), and code division multiple access (CDMA) based wireless protocols. Communications circuitry 13 may also include circuitry that enables the device 10 to be electrically coupled to another device (e.g. a computer or an accessory device) and communicate with that other device. For example, a user input component such as a wearable device may communicate with the device 10 through the communication circuitry 13 using a short-range communication technique such as infrared (IR) or other suitable technique.

The storage 15 may store software (e.g., for implementing various functions on device 10), and any other suitable data. The storage 15 may include a storage medium including various forms volatile and non-volatile memory. Typically, the storage 15 includes a form of non-volatile memory such as a hard-drive, solid state drive, flash drive, and the like. The storage 15 may be integral with the device 10 or may be separate and accessed through an interface to receive a memory card, USB drive, optical disk, a magnetic storage medium, and the like.

An I/O controller 16 may allow connectivity to a display 18 and one or more I/O devices 17. The I/O controller 16 may include hardware and/or software for managing and processing various types of I/O devices 17. The I/O devices 17 may include various types of devices allowing a user to interact with the device 10. For example, the I/O devices 17 may include various input components such as a keyboard/keypad, controller (e.g. game controller, remote, etc.) including a smartphone that may act as a controller, a microphone, and other suitable components. The I/O devices 17 may also include components for aiding in the detection of gestures including wearable components such as a watch, ring, or other components that may be used to track body movements (e.g. holding a smartphone to detect movements).

Figure 3:
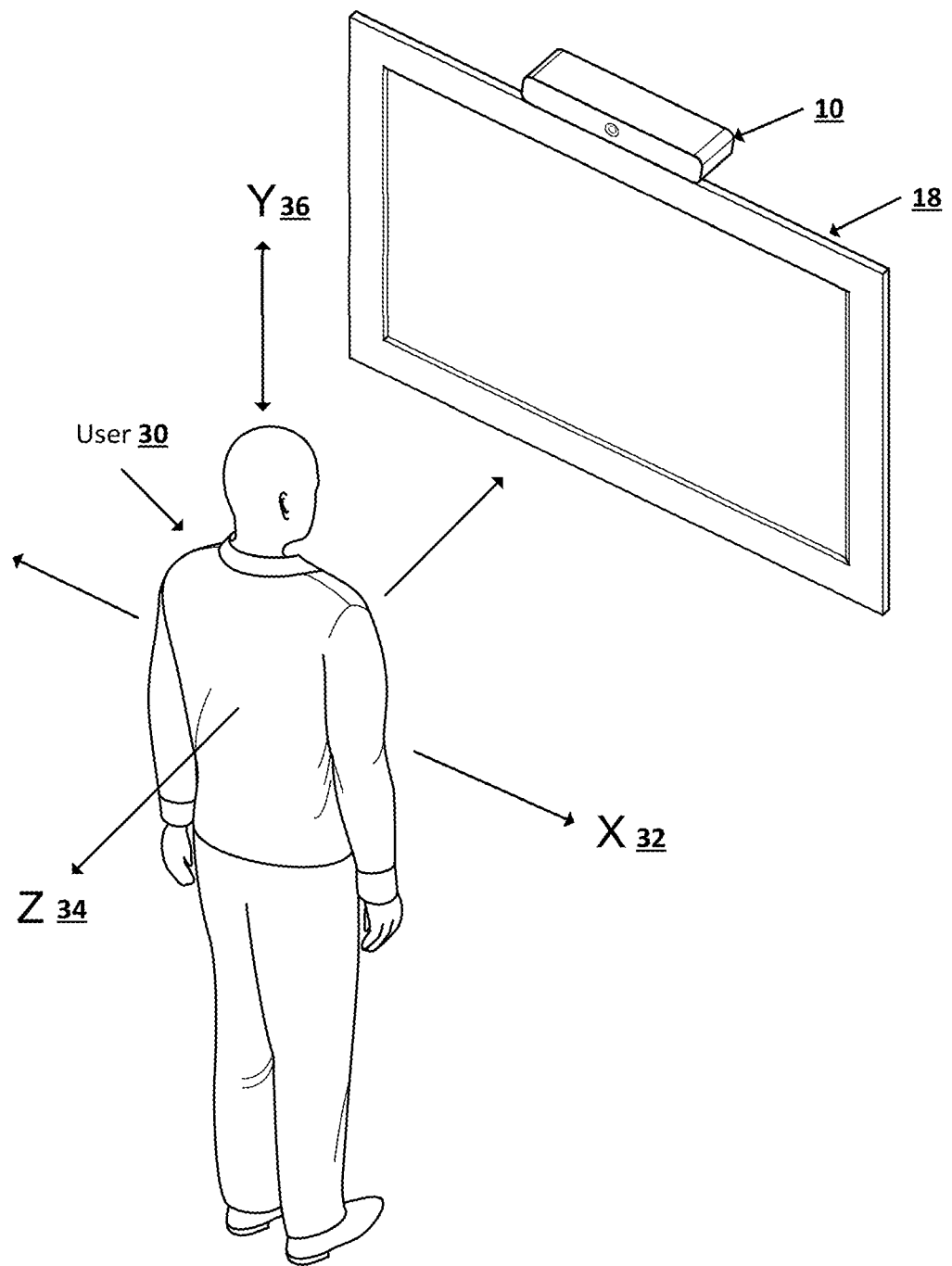
FIG. 3 illustrates an example arrangement of a device capturing gesture movements according to an implementation of the disclosed subject matter.

The device 10 may be or may not be coupled to a display. In implementations where the device 10 is coupled to a display (as shown in FIG. 3), the device 10 may be integrated with or be part of a display 18 (e.g. integrated into a television unit). The display 18 may be any a suitable component for displaying visual output such as a television, computer screen, projector, and the like. The display 18 may include an interface that allows a user to interact with the display 18 or additional components coupled to the device 10. The interface may include menus, overlays, and other display elements that are displayed on a display screen to provide visual feedback to the user including displaying (e.g. playing) one or more content items. As referred to herein, a content item may include music, video, documents, applications (e.g. "apps"), and others forms of media and/or content.

The device 10 may include a capture device 19 (as shown in FIG. 1). Alternatively, the device 10 may be coupled to the capture device 19 through the I/O controller 16 in a similar manner as described with respect to a display 18. For example, a computing device (e.g. server and/or a remote processor) may receive data from one or more capture devices 19 (e.g. cameras disbursed around a room) that are local to the user. The capture device 19 may also be part of a wearable component such as glasses worn by a user. The capture device 19 enables the device 10 to capture still images, video, or both. The capture device 19 may include one or more cameras for capturing an image or series of images continuously, periodically, at select times, and/or under select conditions. The capture device 19 may be used to visually monitor one or more users such that gestures and/or movements performed by the one or more users may be captured, analyzed, and tracked to detect a gesture input as described further herein.

The capture device 19 may be configured to capture depth information including a depth image using techniques such as time-of-flight, structured light, stereo image, or other suitable techniques. The depth image may include a two-dimensional pixel area of the captured image where each pixel in the two-dimensional area may represent a depth value such as a distance. The capture device 19 may include two or more physically separated cameras that may view a scene from different angles to obtain visual stereo data to generate depth information. Other techniques of depth imaging may also be used. The capture device 19 may also include additional components for capturing depth information of an environment such as an IR light component, a three-dimensional camera, and a visual image camera (e.g. RGB camera). For example, with time-of-flight analysis the IR light component may emit an infrared light onto the scene and may then use sensors to detect the backscattered light from the surface of one or more targets (e.g. users) in the scene using a three-dimensional camera or RGB camera. In some instances, pulsed infrared light may be used such that the time between an outgoing light pulse and a corresponding incoming light pulse may be measured and used to determine a physical distance from the capture device 19 to a particular location on a target.

The device 10 may be relatively compact, for example in implementations where the device 10 is a handheld device, enabling a user to easily manipulate the device's position, orientation, and movement. Accordingly, the device 10 may include components for sensing changes in position, orientation, and movement such as a GPS sensor, gyroscope, accelerometer, magnetometer, proximity sensor, lux meter, and/or other sensing components. Further, the device 10 may include a vibration source to facilitate a sending motion, vibration, and/or other movement information to a user during operation of the device 10.

Figure 2:
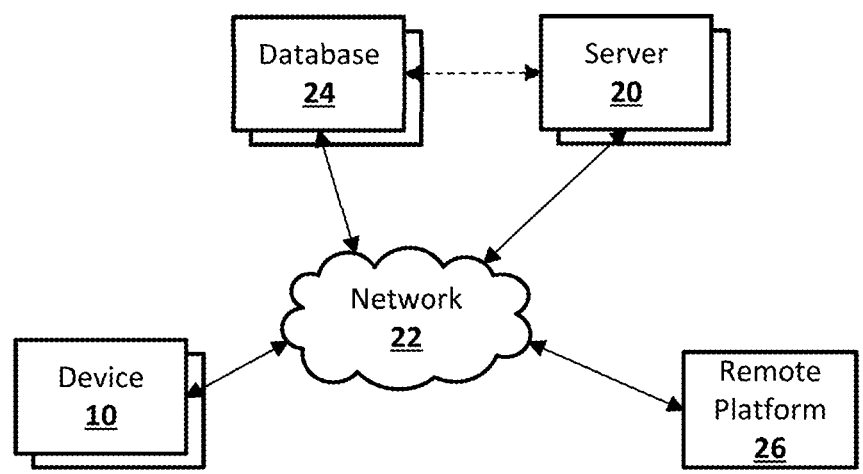
FIG. 2 illustrates an example network arrangement according to an implementation of the disclosed subject matter.

FIG. 2 illustrates an example network arrangement according to an implementation of the disclosed subject matter. A device 10 may communicate with other devices 10, a server 20, which may include a processor 12 as described above, and a database 24 via the network 22. The network 22 may be a local network, wide-area network (including the Internet), and other suitable communications network. The network 22 may be implemented on any suitable platform including wired and wireless technologies. Server 20 may be directly accessible by a device 10, or one or more other devices 10 may provide intermediary access to a server 20. The device 10 and server 20 may access a remote platform 26 such as cloud computing arrangement or service. The remote platform 26 may include one or more servers 20 and databases 24. The term server may be used herein and may include a single server or one or more servers.

FIG. 3 illustrates an example arrangement of a device capturing gesture movements according to an implementation of the disclosed subject matter. The example of FIG. 3 includes a device 10 that is coupled to a display 18, which may display output including gesture feedback information. The user 30 may interact with a device 10 by performing various gestures as described further herein. Gesture detection may be based on measuring and recognizing various body movements of the user 30. When performing gesture detection, specific gestures may be detected based on information defining a gesture, condition, or other information. For example, gestures may be recognized based on information such as a distance of movement (either absolute or relative to the size of the user), a threshold velocity of the movement, a confidence rating, and other criteria. The criteria for detecting a gesture may vary between applications and between contexts of a single application including variance over time.

Typically, a gesture may include a hand movement, but other forms of gestures may also be recognized. For example, a gesture may include movements from a user's arms, legs, feet, and other movements such as body positioning or other types of identifiable movements from a user. These identifiable movements may also include head movements including nodding, shaking, etc., as well as facial movements such as eye tracking, and/or blinking. In addition, gesture detection may be based on combinations of movements described above including being coupled with voice commands, gestures from other users, and/or other parameters. For example, a gesture may be identified based on a hand movement in combination with tracking the movement of the user's eyes, or hand movement of another user, and/or a hand movement in coordination with a voice command.

Gestures may include in-air type gestures that may be performed within a three-dimensional environment. In addition, these in-air gestures may include touchless gestures that do not require inputs to a touch surface. As described, the gesture may include movements within a three-dimensional space, and accordingly, the three-dimensional space may be described based on a coordinate system and/or one or more axes such as an X-axis 32, Y-axis 34, and Z-axis 36. In an implementation, these axes may be defined relative to a capture device 19 as shown in FIG. 3. For example, the X-axis 32 may be substantially parallel to the display 18 and substantially perpendicular to the torso of the user 30. The Y-axis 34 may be substantially parallel to the display 18 and substantially parallel to the torso of the user 30. The Z-axis may be substantially perpendicular to the display 18 and substantially perpendicular to the torso of the user 30. In addition to defining axes in the manner described above, the axes may be established using various references. For example, axes may be established relative to the capture device 19 and/or display 18 (as shown in FIG. 3), relative to a user position (e.g. relative to the user's torso and/or face), relative to the alignment of two users, relative to a gesture movement, and/or other techniques. Accordingly, the device may utilize reference points on the user's body that provide a natural point of reference when performing gestures. For example, the device may select a point on a central portion of the body of a user as a reference point (e.g. origin of a coordinate system) when tracking body movements such as the center of a chest, sternum, solar plexus, center of gravity, or within regions such as the thorax, abdomen, pelvis, and the like. One or more axes may also be defined and/or established based on these reference points. For example, in an implementation, the X-axis may be defined as substantially parallel to a line connecting a left and a right shoulder of the user, the Y-axis may be defined as substantially parallel to a line connecting a head and a pelvis of the user (or parallel to a torso), and the Z-axis may be defined as substantially perpendicular to the X-axis and Y-axis. In another example, a user may perform a substantially up/down gesture movement and a Y-axis may be defined based on this movement. In yet another example, the device may use a hand and/or an initial movement of a hand to establish a point of origin for a coordinate system. For instance, a user may perform an open palm gesture, and in response, the device may establish a point of origin within the palm of the hand. Accordingly, a Y-axis may be defined as substantially along the established point on the palm to a point (e.g. fingertip) of the corresponding index or middle finger (the X-axis and Z-axis may then be defined based on the defined Y-axis).

As described herein, an axis may be described with reference to the user's body. It should be noted that these references may be used in descriptions provided herein, but are illustrative of the axes and may not necessarily correspond directly to techniques used by the computing device to define and/or determine an axis in a specific configuration. For example, an axis may be described as being defined by a line connecting a left shoulder and right shoulder, but the device may use other techniques such as multiple points including points on the head, pelvis, etc. Accordingly, the computing device may use different reference points to define substantially equivalent axes as described herein for gesture movements in order to distinguish between, for example, left/right, forward/back, and up/down movements as perceived by the user.

Figure 4:
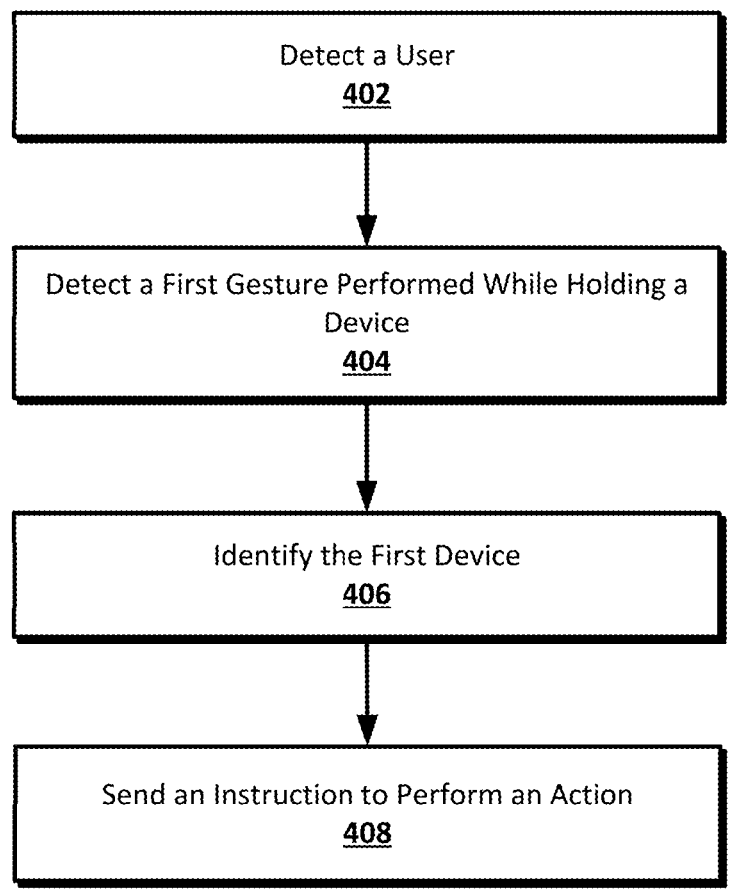
FIG. 4 illustrates a flow diagram of a device recognizing gestures according to an implementation of the disclosed subject matter.

FIG. 4 illustrates a flow diagram of a computing device recognizing gestures according to an implementation of the disclosed subject matter. In 402, a computing device (or "device") may detect a user within a field-of-view of a capture device (e.g. capture device 19) operatively coupled to the device. Detecting may include the device performing the actual detection and/or the device receiving and indication that one or more users have been detected by the capture device. For example, a device (e.g. a processor on a server 20) may receive an indication from a remotely located capture device (e.g. capture device 19) that a user has been detected. The device may detect a user based on detecting particular shapes (e.g. face) that may correspond to a user, motion (e.g. via a motion detector that may be part of or separate from the capture device), sound (e.g. a speech command), and/or other forms of stimuli. The device may detect the entire body of a user or portions of the user. Upon detecting a user, the device may initiate gesture detection. As described above, gesture detection may track a position of a user including particular features (e.g. hands, face, etc.) and/or a position, orientation, and/or movement of a device.

The device may also determine the number of users within a field-of-view. A field-of-view as described herein may include an area perceptible by one or more capture devices (e.g. perceptible visual area). The device may determine one or more identities of users detected by the capture device. The device may identify a user based on user credentials (e.g. logging into a user account) and/or recognition techniques such as facial recognition, fingerprint recognition, and/or voice recognition. The device may attempt to identify a user in order to perform contextual or user specific actions. For example, the device may identify a user in order to transfer content from one device to another device, which may be associated with the identified user. In another example, the device may disambiguate a gesture such as a pointing gesture to determine the identity of the user that is being referenced. In yet another example, the device may disambiguate words of a speech command that may supplement a gesture. For example, these speech commands may include words such as personal pronouns (e.g. "open my calendar," "send him this picture," etc.), which may be disambiguated.

In 404, the computing device may detect a first gesture performed by the first user. In an implementation, the user may perform the first gesture while holding a first device with a first hand. For example, a user may perform an intuitive gesture to transfer or share content from one device to another device. In real-life situations, a user may show the display screen of a device to another user to allow them to view the content displayed on the device. Accordingly, a gesture may mimic this physical analogy when sharing and/or transferring content. For example, a user may perform a gesture that shows the display screen of a first device (e.g. smartphone or tablet) to a second device (e.g. television or smart television). This gesture may occur while the display screen is displaying a content item, and accordingly, the television may seamlessly begin displaying the content item. The computing device may query the first device for information (e.g. via a network) regarding the content item (e.g. playback time). For example, if video content is playing on the tablet, playback of the video may seamlessly continue on the television from the point at which the gesture was performed.

Figure 5:
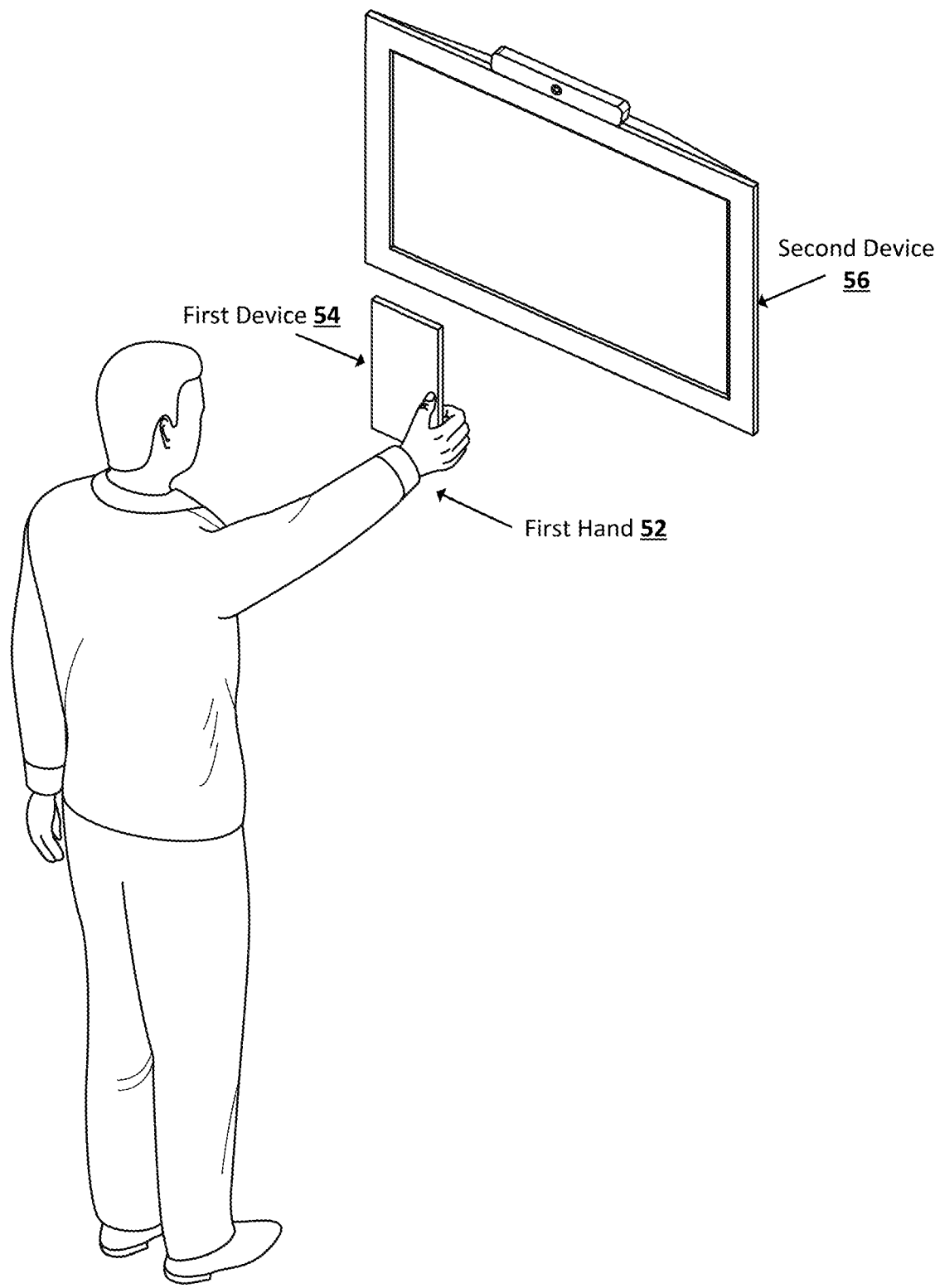
FIG. 5 illustrates an example of a user gesturing by showing a display screen of a first device to a second device according to an implementation of the disclosed subject matter.

FIG. 5 illustrates an example of a user gesturing by showing a display screen of a first device to a second device according to an implementation of the disclosed subject matter. As shown in this example, a user may perform a gesture while holding a first device 54 (in this case a handheld device) with a first hand 52. The gesture may include positioning the first device 54 such that a display screen of the first device 54 is facing (or shown to) the second device 56 (in this case a television). In order to determine an orientation of the first device 54, the computing device may receive orientation information from one or more sensors of the first device 54 (and/or second device 56). For example, information from a gyroscope and/or accelerometer on the first device 54 may be coupled with information from a capture device to determine that the first device 54 has been manipulated (e.g. rotated, elevated, etc.) in a manner such as to show the display screen of the first device 54 to the television.

A user may perform an intuitive gesture to transfer or share content from one device and/or user to another device and/or user by other techniques. In another implementation, the first gesture may include positioning the first device proximal to a second hand of a second user. In real-life situations, a user may share an item by physically transferring it from the hand of one person to another. Accordingly, a gesture may mimic this real-word physical interaction when transferring and/or sharing. For example, a user may perform a gesture that positions a device within a predefined proximity of a hand of another user. When performing such a gesture, the computing device may also determine an orientation of the second user's hand. For example, an open palm may provide an indication that the second user is prepared to receive the device.

Figure 6:
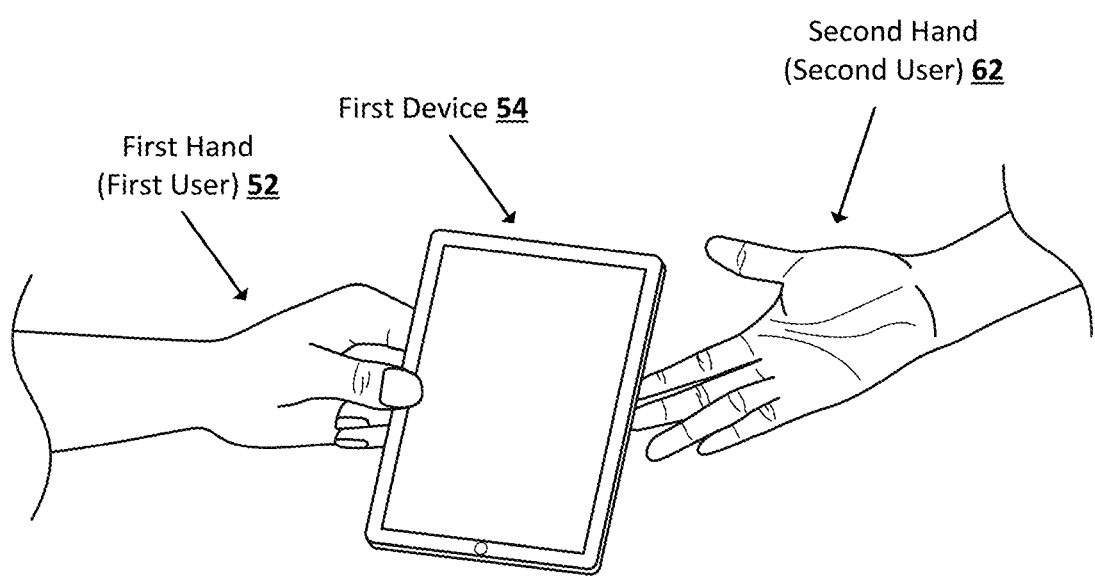
FIG. 6 illustrates an example of a user gesturing by positioning a device proximal to a hand of another user according to an implementation of the disclosed subject matter.

FIG. 6 illustrates an example of a user gesturing by positioning a device proximal to a hand of another user according to an implementation of the disclosed subject matter. As shown, the gesture may include positioning the first device 54 that is held by a first hand of a first user 52 proximal to a second hand of a second user 62. As shown, the second hand may include a substantially open palm, which the computing device may also detect.

The computing device may also detect a second and third gesture. In an implementation, the second gesture may be performed by the second hand of the first user and may include touching a content item displayed on a display screen of the first device. In addition, the third gesture may be performed by the second hand of the first user and may include touching a second device with the first hand.

Figure 7:
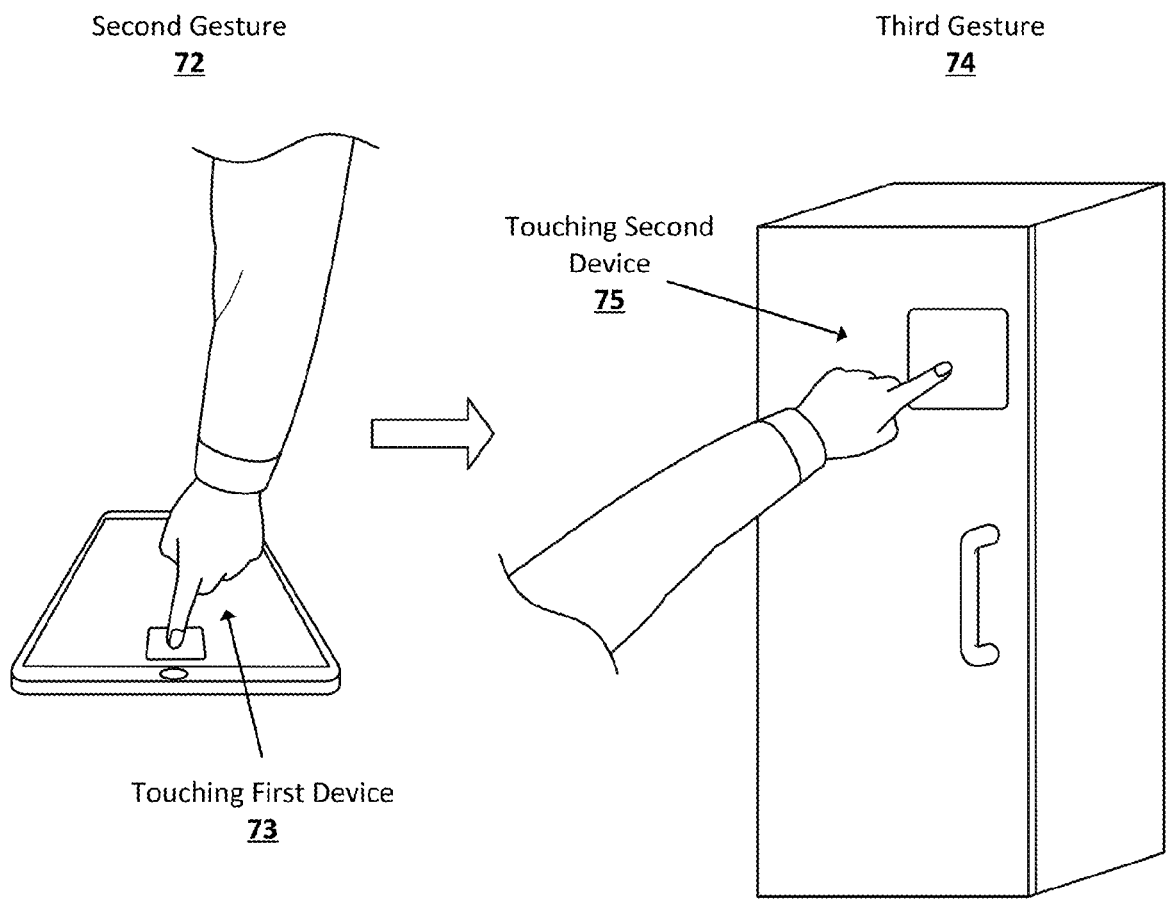
FIG. 7 illustrates an example of a user gesturing by touching a first device and then a second device according to an implementation of the disclosed subject matter.

FIG. 7 illustrates an example of a user gesturing by touching a first device and then a second device according to an implementation of the disclosed subject matter. As shown, a second gesture 72 may include touching a first device 73 and then a third gesture 73 performed after the second gesture may include touching a second device 75. For example, a user may touch a content item on the first device and then transfer the content item to the second device by touching the second device. Accordingly, the gesture may mimic physically transferring a content item by being virtually contained in the touch gestures. In another example, a first user may touch a content item and then a second user may touch the content item to transfer the item from the first user to the second user. In such a scenario, a computing device may, for example, identify one or both users via a finger recognition technique.

Returning to FIG. 4, in 406, the computing device may identify a first device and/or a second device. This may occur prior to, during, or after detecting a gesture. For example, the computing device may identify the first device, and other devices within the field-of-view of the capture device, prior to detecting a gesture by taking an inventory of devices upon detecting a user within the field-of-view of the capture device. In another example, the computing device may receive positional data from the first device contemporaneously to the detection of a gesture. By identifying a device, the computing device may transfer and/or share content items as described above to the appropriate devices.

In 408, the computing device may send, in response to the detected first gesture, an instruction to the first device to perform an action. This instruction may be sent through a network to one or more devices. The action may also include transferring the content item to the second device. For example, the first device may initiate a transfer (e.g. via the network) of a content item to the second device. In addition, the action may include authorizing the second device to access the content item. For example, after granting access to the content item by the second device, the second device may access the content item from a remote source (e.g. cloud service). The device may also measure the detected gesture movements, and accordingly, actions may be based on the measured movements. The instructions may also initiate other types of actions and/or commands. For example, actions may include, but are not limited to, to control of the device (e.g. turn on or off, louder, softer, increase, decrease, mute, output, clear, erase, brighten, darken, etc.), communications (e.g. e-mail, mail, call, contact, send, receive, get, post, tweet, text, etc.), document processing (e.g. cut, paste, open, load, close, edit, save, undo, replace, delete, insert, format, etc.), searches (e.g., find, search, look for, locate, etc.), content delivery (e.g. show, play, display), and/or other actions and/or commands.

In situations in which the implementations of the disclosed subject matter collect and/or use personal information about users (e.g. identity information), the system may provide users with the ability to control and/or set preferences related to the collection of such data. In addition, certain information may be treated in one or more ways before it is stored and/or used, so that personally identifiable information is removed. For example, a user may be provided with the option to remain anonymous or not be identified through a recognition function as described herein.

Various implementations may include or be embodied in the form of computer-implemented process and an apparatus for practicing that process. Implementations may also be embodied in the form of a computer-readable storage containing instructions embodied in a non-transitory and tangible storage and/or memory, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular feature, but every implementation may not necessarily include the feature. Moreover, such phrases are not necessarily referring to the same implementation. Further, when a particular feature is described in connection with an implementation, such feature may be included in other implementations whether or not explicitly described. The term "substantially" may be used herein in association with a claim recitation and may be interpreted as "as nearly as practicable," "within technical limitations," and the like. Terms such as first, second, etc. may be used herein to describe various elements, and these elements should not be limited by these terms. These terms may be used distinguish one element from another. For example, a first gesture may be termed a second gesture, and, similarly, a second gesture may be termed a first gesture.

The foregoing description, for purpose of explanation, has been described with reference to specific implementations. However, the illustrative discussions above are not intended to be exhaustive or to limit implementations of the disclosed subject matter to the precise forms disclosed. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   obtaining multiple images;
   determining that the multiple images include (i) a first image that shows a user performing a gesture that involves the user touching a first display of a first computing device, and (ii) a second image that shows the user performing a gesture that involves the user touching a second display of a second computing device;
   in response to determining that the multiple images include (i) the first image that shows a user performing a gesture that involves the user touching the first display of the first computing device, and (ii) the second image that shows the user performing a gesture that involves the user touching the second display of the second computing device, identifying content that is displayed on the first display of the first computing device; and
   providing the second computing device with access to at least a portion of the content.

2. The computer-implemented method of claim 1, comprising transmitting, to the first computing device, a request to identify the content that is displayed on the first display of the first computing device, and receiving, in response to the request, a response that identifies the content.

3. The computer-implemented method of claim 1, comprising:
   determining an identity of the user; and
   wherein identifying content that is displayed on the first display of the first computing device comprises identifying content that is displayed on the first display of the first computing device based at least on the identity of the user.

4. The computer-implemented method of claim 1, comprising, before identifying content that is displayed on the first display of the first computing device, transmitting an instruction to the first computing device to request access by the second computing device to content that is displayed on the first display of the first computing device.

5. The computer-implemented method of claim 4, comprising receiving the identified content from a remote source that is other than the first computing device.

6. The computer-implemented method of claim 1, wherein the portion of the content comprises a content item associated with an area of the first display touched by the user.

7. The computer-implemented method of claim 1, wherein:
   identifying content that is displayed on the first display of the first computing device, comprises identifying (i) a video item including content that is displayed on the first display of the first computing device at a particular point in time, and (ii) a playback position of the video item that corresponds to the content that is displayed on the first display of the first computing device at the particular point in time; and
   providing the second computing device with access to at least the portion of the content, comprises providing the second computing device with (i) access to the video item, and (ii) data that indicates the playback position of the video item.

8. A non-transitory computer-readable storage device having instructions stored thereon that, when executed by a computing device, cause the computing device to perform operations comprising:
   obtaining multiple images;
   determining that the multiple images include (i) a first image that shows a user performing a gesture that involves the user touching a first display of a first computing device, and (ii) a second image that shows the user performing a gesture that involves the user touching a second display of a second computing device;
   in response to determining that the multiple images include (i) the first image that shows a user performing a gesture that involves the user touching the first display of the first computing device, and (ii) the second image that shows the user performing a gesture that involves the user touching the second display of the second computing device, identifying content that is displayed on the first display of the first computing device; and
   providing the second computing device with access to at least a portion of the content.

9. The storage device of claim 8, wherein the operations comprise:
   transmitting, to the first computing device, a request to identify the content that is displayed on the first display of the first computing device, and receiving, in response to the request, a response that identifies the content.

10. The storage device of claim 8, wherein the operations comprise:
    determining an identity of the user; and
    wherein identifying content that is displayed on the first display of the first computing device comprises identifying content that is displayed on the first display of the first computing device based at least on the identity of the user.

11. The storage device of claim 8, wherein the operations comprise, before identifying content that is displayed on the first display of the first computing device:
    transmitting an instruction to the first computing device to request access by the second computing device to content that is displayed on the first display of the first computing device.

12. The storage device of claim 11, wherein the operations comprise:
    receiving the identified content from a remote source that is other than the first computing device.

13. The storage device of claim 8, wherein the portion of the content comprises a content item associated with an area of the first display touched by the user.

14. The storage device of claim 8, wherein:
    identifying content that is displayed on the first display of the first computing device, comprises identifying (i) a video item including content that is displayed on the first display of the first computing device at a particular point in time, and (ii) a playback position of the video item that corresponds to the content that is displayed on the first display of the first computing device at the particular point in time; and providing the second computing device with access to at least the portion of the content, comprises providing the second computing device with (i) access to the video item, and (ii) data that indicates the playback position of the video item.

15. A system comprising:

one or more data processing apparatus; and a non-transitory computer-readable storage device having stored thereon instructions that, when executed by the one or more data processing apparatus, cause the one or more data processing apparatus to perform operations comprising:

obtaining multiple images;

determining that the multiple images include (i) a first image that shows a user performing a gesture that involves the user touching a first display of a first computing device, and (ii) a second image that shows the user performing a gesture that involves the user touching a second display of a second computing device;

in response to determining that the multiple images include (i) the first image that shows a user performing a gesture that involves the user touching the first display of the first computing device, and (ii) the second image that shows the user performing a gesture that involves the user touching the second display of the second computing device, identifying content that is displayed on the first display of the first computing device; and providing the second computing device with access to at least a portion of the content.

16. The system of claim 15, wherein the operations comprise:

transmitting, to the first computing device, a request to identify the content that is displayed on the first display of the first computing device, and receiving, in response to the request, a response that identifies the content.

17. The system of claim 15, wherein the operations comprise:

determining an identity of the user; and wherein identifying content that is displayed on the first display of the first computing device comprises identifying content that is displayed on the first display of the first computing device based at least on the identity of the user.

18. The system of claim 15, wherein the operations comprise, before identifying content that is displayed on the first display of the first computing device:

transmitting an instruction to the first computing device to request access by the second computing device to content that is displayed on the first display of the first computing device.

19. The system of claim 18, wherein the operations comprise:

receiving the identified content from a remote source that is other than the first computing device.

20. The system of claim 15, wherein the portion of the content comprises a content item associated with an area of the first display touched by the user.

* * * * *